(12) United States Patent
Lizcano et al.

(10) Patent No.: US 11,859,315 B1
(45) Date of Patent: Jan. 2, 2024

(54) FABRICATION OF MULTIFUNCTIONAL BN FINE FIBERS BY FORCE SPINNING METHOD

(71) Applicant: United States of America as represented by the Administrator of NASA, Washington, DC (US)

(72) Inventors: Maricela Lizcano, Cleveland, OH (US); Diana Santiago-Dejesus, Cleveland, OH (US)

(73) Assignee: United States of America as Represented by the Administrator of National Aeronautics and Space Administration, Washington, DC (US)

(*) Notice: Subject to any disclaimer, the term of this patent is extended or adjusted under 35 U.S.C. 154(b) by 0 days.

(21) Appl. No.: 17/582,329

(22) Filed: Jan. 24, 2022

Related U.S. Application Data

(60) Provisional application No. 63/140,395, filed on Jan. 22, 2021.

(51) Int. Cl.

| | |
|---|---|
| *B29C 41/04* | (2006.01) |
| *B29C 71/04* | (2006.01) |
| *C04B 35/583* | (2006.01) |
| *D01D 1/02* | (2006.01) |
| *D01D 1/04* | (2006.01) |
| *D01D 5/40* | (2006.01) |
| *D01D 10/02* | (2006.01) |
| *D01D 5/18* | (2006.01) |
| *D01F 9/10* | (2006.01) |
| *C04B 35/622* | (2006.01) |
| *C04B 41/00* | (2006.01) |

(52) U.S. Cl.
CPC ............ *D01D 5/18* (2013.01); *B29C 41/042* (2013.01); *C04B 35/6229* (2013.01); *C04B 41/0045* (2013.01); *D01F 9/10* (2013.01); *C04B 2235/658* (2013.01); *C04B 2235/661* (2013.01)

(58) Field of Classification Search
CPC ....... B29C 41/04; B29C 41/042; B29C 71/04; C04B 35/583; C04B 35/6229; C04B 41/0045; C04B 2235/658; C04B 2235/661; D01D 1/02; D01D 1/04; D01D 5/18; D01D 5/40; D01D 10/02; D01F 9/10
USPC .... 264/211.1, 236, 310, 311, 495, 639, 646, 264/647, 662, 666, 674, 676
See application file for complete search history.

(56) References Cited

U.S. PATENT DOCUMENTS 5,780,154 A * 7/1998 Okano ................ D01F 9/10
428/366

* cited by examiner

*Primary Examiner* — Leo B Tentoni
(74) *Attorney, Agent, or Firm* — Robert H. Earp, III; Mark Wolfgang; Trenton J. Roche (57) ABSTRACT

A method of preparing hexagonal boron nitride (h-BN) fibers includes mixing polyvinylpyrrolidone (PVP) and boron oxide ($B_2O_3$) to form a polymer precursor or mixing PVP and ammonia borane ($BH_3NH_3$) to form the polymer precursor. The method includes forcespinning the polymer precursor to form fibers of the polymer precursor, curing the fibers to form polymer fibers, and pyrolyzing the polymer fibers to form the h-BN fibers.

20 Claims, 5 Drawing Sheets

FABRICATION OF MULTIFUNCTIONAL BN FINE FIBERS BY FORCE SPINNING METHOD

CROSS REFERENCE TO RELATED APPLICATION

This application claims priority to U.S. Provisional Patent Application Ser. No. 63/140395 filed Jan. 22, 2021, which is expressly incorporated herein by reference.

ORIGIN OF THE INVENTION

The invention described herein was made by employees of the United States Government and may be manufactured and used by or for the Government for Government purposes without the payment of any royalties thereon or therefor.

BACKGROUND

Hexagonal boron nitride (h-BN) nano materials are useful in various fields due to the materials being chemically inert, being lightweight yet having high strength, and having high electrical resistivity while having high thermal conductivity. However, the use of BN as nanofibers is limited due to respiratory health hazards associated with their normally small size (<100 nm fiber diameter) and high cost of production. Therefore, BN fibers are not currently commercially available, and instead only very expensive BN nanotube products are available. Available BN nanosheets provide excellent dielectric properties, but their use is also limited as the form factor is already set as a sheet and they are difficult to disperse due to their relatively large size along its plane, as are BN nanotubes.

A polymer derived ceramic (PDCs) is a ceramic material formed by the pyrolysis of a pre-ceramic polymer, usually under inert atmosphere, which causes the pre-ceramic polymer to form the PDC. PDCs may be formed by adding various starting materials together to form, for example, a precursor material. Either polymeric powders or polymeric solutions are used as precursor material. The precursor material is then formed into a desired shape and cured to crosslink the polymeric matrix. The precursor polymer is then pyrolyzed to form a PDC having the desired shape. The pre-ceramic material can be formed into a desired shape by spinning into fibers, non-woven mats, yarns, casting into thin films, or molding into complex shapes.

SUMMARY

In one aspect, a method of preparing hexagonal boron nitride (h-BN) fibers includes mixing polyvinylpyrrolidone (PVP) and boron oxide ($B_2O_3$) to form a polymer precursor or mixing PVP and ammonia borane ($BH_3NH_3$) to form the polymer precursor. The method includes forcespinning the polymer precursor to form fibers of the polymer precursor; curing the fibers to crosslink the polymer's molecular chains; and then pyrolyzing the crosslinked polymer precursor fibers to form the h-BN fibers.

DETAILED DESCRIPTION

The present subject matter provides hexagonal boron nitride (h-BN) fibers and a related method of producing such fibers using a Polymer Derived Ceramic (PDC) process. The advantage of preparing a PDC is the ability to form the ceramic into complex, lightweight, and mechanically robust shapes that otherwise are too difficult to make by machining. PDC also offers an opportunity to control chemistry of the PDC for better end product homogeneity and tailoring properties.

In this case, it is preferred to have a boron to nitrogen (N) ratio of 1:1. The starting materials are dissolved in solution, followed by forming a nanofiber from the solution, and then curing the fibers. The curing or crosslinking process is used to link the monomers to one another. The curing step stabilizes the fibers, which stabilization is useful during high temperature ceramic conversion (pyrolysis). Crosslinking can be performed using different methods such as adding a reactant to solutions or by UV exposure. Finally, the crosslinked polymer is heat treated (pyrolyzed) under specified conditions to convert the polymer fibers to ceramics.

The fibers are made from a starting material including polyvinylpyrrolidone (PVP) along with either boron oxide ($B_2O_3$) or ammonia borane ($BH_3NH_3$), which are dissolved in a solvent. PVP has a chemical formula of $[C_6H_9NO]_n$, and chemical structure as shown below.

In the chemical formula and chemical structure, "n" indicates the number of monomers in the polymer chain and determines the molecular weight of the PVP polymer.

Boron oxide has a chemical structure are follows:

Ammonia borane (aka, borane ammonia complex) has a chemical structure as follows:

These starting materials are dissolved in the solvent to form a precursor solution, which is then subjected to forcespinning to produce precursor polymeric fibers. Force spinning involves the use of centrifugal forces to force the prepared polymeric solution through a small orifice to produce fine fibers. During the spinning process, the solvent used to make the polymeric solution is evaporated leaving behind fine precursor polymeric fibers with diameters as small as 200 nm to 6 μm, and lengths as long as 6 ft. Diameter of the fibers depends on the viscosity of the precursor solution and the speed of the spinneret.

These precursor fibers are then cured (i.e., crosslinked) to form pre-ceramic polymer fibers, which are then subject to pyrolysis to form a PDC of h-BN ceramic fibers. The process is easy, fast, and has a high yield with minimum chemical wastes. Further, the method uses $B_2O_3$, $BH_3NH_3$, or combinations thereof as starting materials, which are relatively inexpensive and readily available.

The steps chosen to be used in any PDC process, and the parameters of those steps are dependent on the individual starting materials that are selected. That is, every PDC process is specifically tailored to the starting materials that are used. If the steps of the PDC process or their parameters are not correct for the starting materials of $B_2O_3$ or $BH_3NH_3$, then the process will not produce a PDC, and will instead produce another undesired end product that is not a ceramic. To date, no h-BN fibers have been produced in a PDC process using the starting materials of $B_2O_3$. In the case of $BH_3NH_3$, PDC fibers have not been produced using forcespinning method. These starting materials are desirable because of they are readily available, easy to handle, and are relatively inexpensive compared to other starting materials including Boron. Because the parameters of a PDC process are dependent on the specific starting materials that are used, the PDC process described herein can be used with the starting materials including $B_2O_3$ or $BH_3NH_3$, and therefore other boron-containing starting materials might not simply be used in place of $B_2O_3$ or $BH_3NH_3$ in this process.

The PDC process includes four basic steps. A first step is mixing the starting materials to form a precursor polymeric solution/material. A second step involves forming the precursor material to have a desired shape or form factor. A third step includes curing the precursor material to form a crosslinked precursor polymeric material having the desired shape or form factor. A fourth step includes pyrolyzing the pre-ceramic material to form the PDC. Other steps and sub-steps can be used in the process.

Forming Polymer Precursor

Figure 9:
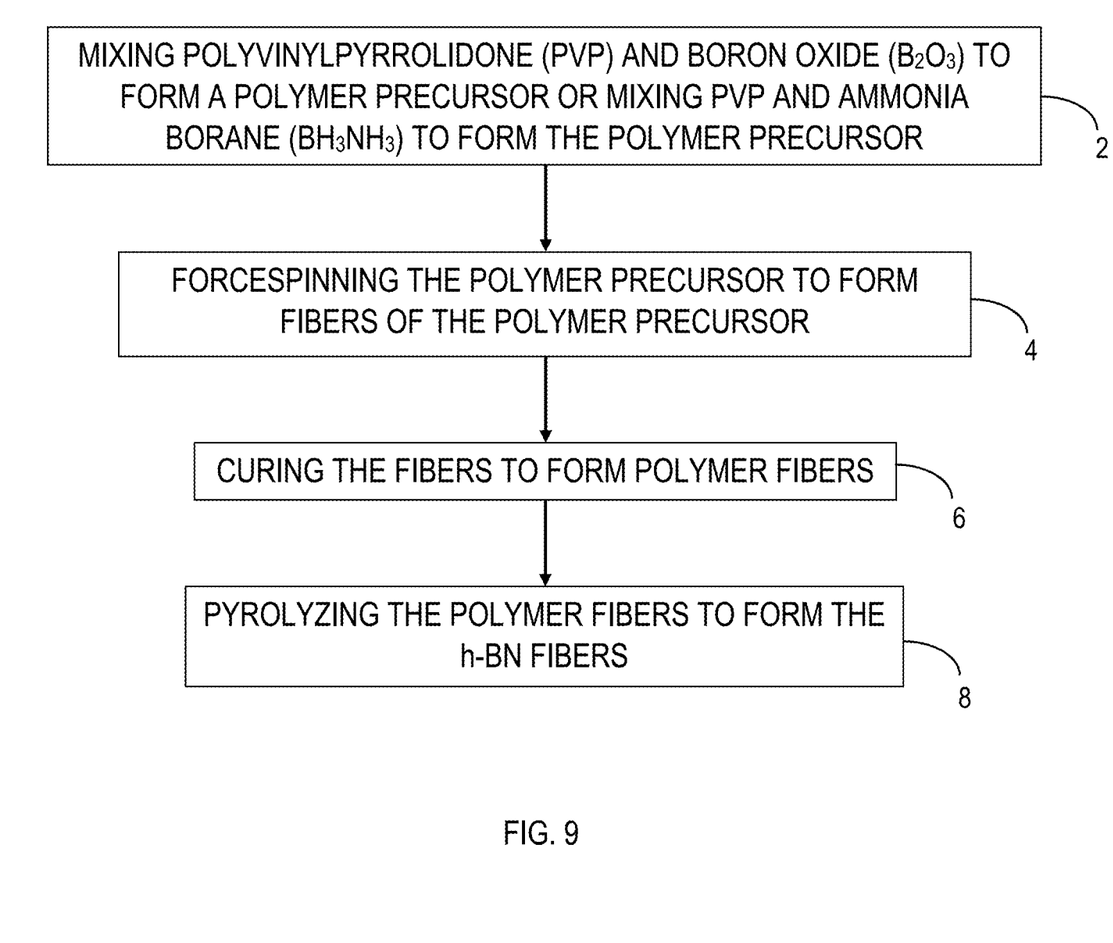
FIG. 9 is a flow diagram of a method according to the present subject matter.

With reference to FIG. 9, the first step 2 of this invention includes making a polymer precursor (e.g., precursor solution) from the starting materials. The starting materials include a solvent, water, or a combination thereof. The solvent included in the starting materials may depend on the starting polymer. The starting materials also include a solute to be dissolved in the solvent. The solute includes $B_2O_3$, $BH_3NH_3$, or combinations thereof, along with PVP, which are added to and dissolved in the solvent to make a precursor solution.

The polymer precursor may include or consist of PVP, $B_2O_3$, and ethanol. The polymer precursor may be a precursor solution including 10-20 wt. % PVP and 3-6 wt. % $B_2O_3$ dissolved in 75-85 wt. % ethanol, where PVP and $B_2O_3$ are the solute and ethanol is the solvent. In another embodiment, the polymer precursor may include or consist of PVP, $BH_3NH_3$, and ethanol. The polymer precursor may be a precursor solution including 10-20 wt. % PVP and 3-6 wt. % $BH_3NH_3$ dissolved in 75-85 wt. % ethanol, where PVP and $BH_3NH_3$ are the solute and ethanol is the solvent.

The solute may include 70-80 wt. % or 75 wt. % PVP and may include 20-30 wt. % or 25 wt. % $B_2O_3$. The weight ratio of PVP to ethanol may be 0.10-0.25 or 0.15-0.20, and the weight ratio of ethanol to $B_2O_3$ may be 5-35, 10-25, or 15-21. The PVP may have a molecular weight of 300,000 or higher. The polymer precursor may not include a polymerization catalyst. In another embodiment, the solute may include 70-80 wt. % or 75 wt. % PVP and may include 20-30 wt. % or 25 wt. % $BH_3NH_3$. The weight ratio of PVP to ethanol may be 0.10-0.25 or 0.15-0.20, and the weight ratio of ethanol to $BH_3NH_3$ may be 5-35, 10-25, or 15-21. The PVP may have a molecular weight of 300,000 or higher. The polymer precursor may not include a polymerization catalyst.

There are several parameters that must be considered when dissolving and mixing the starting materials, such as solubility of the solute in the solvent, mixing speeds, mixing times, and mixing temperatures. Solutions may be prepared by mixing the starting material by stirring on a magnetic stirrer until the solute is completely dissolved.

Forcespinning

The second step 4 includes forcespinning the polymer precursor (i.e., pre-ceramic solution) to make fibers of polymer precursor. Forcespinning may be accomplished using a forcespinning machine, such as the Cyclone™ FE 1.1 available from FibeRio Technology Corp. of McAllen, Texas. These machines include a spinneret ejects the precursor solution under centrifugal forces through nozzles to form the nanoscale fibers. During forcespinning, the solvent used to make the solution is evaporated leaving behind fine precursor fibers with diameters as small as 200 nm to 6 μm and lengths as long as 6 ft long depending on the viscosity of the preceramic solution and the speed of the spinneret.

The viscosity of the solution, and the parameters of the mixing and forcespinning may determine the quality of the end product.

The properties of the solution may be tailored so as to make the solution appropriate for the second step of forcespinning. This may include providing a solution having a desired viscosity, which may depend on, among other things, the amount of solute in the solvent, and the molecular weight of the PVP. The PVP may have a molecular weight of 300,000 or higher. If solution viscosity is too low, the fibers will not form. If solution viscosity is too high, the spinneret may become clogged preventing fiber formation.

The fiber quality will depend on many factors such as viscosity (n) of the solution and spinning rates. Spinning rates affect fiber quality and determine fiber diameters. Higher rates form smaller diameter fibers and vice versa. If spinning rates are too slow, beading can occur within the fibers. There is also a dependence of polymer molecular weight (MW) on the fiber formation.

The forcespinning method uses centrifugal forces to form fine fibers out of polymeric solutions. During the forcespinning process, the solvent used to make the solution is evaporated, leaving behind fine polymeric fibers with diameters as small as 200 nm to 6 μm depending on speed of the spinneret and lengths as long as 6 ft. The fibers may be deposited as they are ejected from the spinneret so as to form a non-woven 3-D multi-directional network of fibers.

Curing

The third step 6 includes curing the precursor fibers to produce pre-ceramic polymer fibers. Curing makes the fibers more durable and able to be handled. Curing the precursor polymeric fibers may be accomplished by any known method including by the application of heat, radiation, electron beams, or chemical additives. The radiation may include ultraviolet radiation. In several embodiments, no chemical additive (i.e., polymerization catalyst or curing agent) is used, and therefore the precursor polymer solution and precursor polymeric fibers do not include a polymerization catalyst. In an embodiment, the precursor solution consists of PVP, solvent, and $B_2O_3$ or $BH_3NH_3$.

Pyrolysis

The fourth step 8 includes pyrolyzing the pre-ceramic polymer fibers to form ceramic fibers of h-BN. Pyrolyzing includes heating the pre-ceramic polymer fibers in an inert atmosphere, e.g., in a furnace under inert atmosphere. The pre-ceramic fibers may be placed on a graphitic foil substrate to prevent the fibers adhering to the alumina boat. The peak temperature of pyrolyzing may be 1000-1500° C., 1250-1350° C., or 1350° C., which peak temperature may be maintained for up to 3 hours, or 1-2 hours, 1.5 hours, or longer than 3 hours. The heating of the pre-ceramic polymer fibers may include increasing the heat from ambient temperature (e.g., 20-25° C.) to the peak temperature at rate of 1-50°/min, 2-10°/min, or 5°/min. The inert atmosphere may include nitrogen, hydrogen, ammonia, or combinations thereof including nitrogen and hydrogen.

Optional Steps

The method may include a step of manipulating the fibers before or after they are cured. This may include pressing the fibers in to a particular shape, such as a sheet, which after curing and pyrolyzing, may produce a sheet of h-BN fibers.

The method of making h-BN fibers using the PDC process may include a heat treatment step after the pyrolysis step. This heating step may occur after the h-BN fibers have been cooled following pyrolysis back to ambient temperature. The heating step may include heating the h-BN fibers from ambient temperature to a peak temperature of 300-600° C., and this heating may be conducted in air.

The PDC method may include various other steps that help tailor properties and shapes of the final product.

Product

The h-BN PDC fibers may have fiber diameters of 200 nm-6 μm, or 1-3 μm, and may have a length of up to 6 feet. The BN nanofibers may be used to provide innovative alternatives as materials for re-entry heat shields and in electric motors, since they are multifunctional materials with excellent thermal and dielectric properties. Successful conversion of precursor material to h-BN nanofibers may permit the development of BN yarns which could then be woven into flexible h-BN fabrics or ropes/ties that are thermally conductive and electrically insulating.

The pre-ceramic nanofibers can also be formed into pre-ceramic thin films and converted to ceramic thin films before or after a vehicle launch. BN fibers can be used as strengthening reinforcements in polymer composites that provide similar thermal and electrical properties mentioned above.

The h-BN fibers may be formed into mats to layer in non-woven mats or weaved fabrics of flexible h-BN from spun yarns for lightweight high voltage, high power applications needed for electric propulsion. Fibers of the proposed size are easier to handle and disperse than nanotubes or nanosheets and avoid respiration safety hazards. Nanofibers of h-BN are expected to provide high strength, high temperature performance, and improved thermal management. The h-BN fibers can be used for multifunctional components for thermal management with higher temperature capability as well as higher voltage performance for applications such as re-entry shielding, structural energy storage panels, electric motors. Developing h-BN in fiber form will allow development of unique materials.

These h-BN nanofibers can be incorporated into various components to provide potential strength enhancement, and their orientations can be controlled to improve various properties of the component, e.g., thermal management.

The h-BN fibers can be used to make low-cost layered h-BN fiber mats or weaved fabrics of flexible h-BN from spun yarns for lightweight high voltage and power applications needed in electric propulsion. The size of the fibers is easier to handle and disperse than nanotubes or nanosheets and avoids respiratory safety hazards.

EXAMPLES

The following examples as shown in Table 1 were prepared according to the present subject matter, but in no way limit the invention.

TABLE 1a

| Example | PVP to Ethanol Ratio | PVP to $B_2O_3$ Ratio | PVP wt. % | $B_2O_3$ wt. % | Ethanol wt. % |
|---|---|---|---|---|---|
| 1 | 0.10 | 3.07 | 8.9 | 2.9 | 88.2 |
| 2 | 0.15 | 3.13 | 12.5 | 4.0 | 83.5 |
| 3 | 0.20 | 3.05 | 15.8 | 5.2 | 79.0 |
| 4 | 0.15 | 2.50 | 12.4 | 4.9 | 82.7 |
| 5 | 0.15 | 1.50 | 12.0 | 8.0 | 80.0 |
| 6 | 0.15 | 0.75 | 11.1 | 14.8 | 74.1 |
| 7 | 0.15 | 3.14 | 12.5 | 4.0 | 83.5 |
| 8 | 0.15 | 2.49 | 12.4 | 5.0 | 82.6 |

TABLE 1b

| Example | PVP to Ethanol Ratio | PVP to $BH_3NH_3$ Ratio | PVP wt. % | $BH_3NH_3$ wt. % | Ethanol wt. % |
|---|---|---|---|---|---|
| 9 | 0.15 | 3.12 | 12.5 | 4.0 | 83.5 |
| 10 | 0.20 | 3.02 | 15.8 | 5.2 | 79.0 |
| 11 | 0.15 | 2.50 | 12.4 | 5.0 | 82.6 |
| 12 | 0.21 | 3.32 | 16.5 | 5.0 | 78.5 |
| 13 | 0.22 | 3.42 | 17.1 | 5.0 | 77.9 |
| 14 | 0.25 | 3.80 | 19.0 | 5.0 | 76.0 |

In Examples 1-6, PVP, $B_2O_3$, and ethanol were mixed at the above wt. % and ratios on a magnetic stirrer for several hours, thereby forming a precursor solution. The PVP had a molecular weight of 300,000 or higher. Examples 2-4 with PVP/ethanol ratios of 0.15 and 0.20 appeared to have the best solubility. Examples 7 and 8 yielded fibers with reduced stickiness/wetness in comparison with examples 1-6. The solutions were subjected to forcespinning using a Cyclone™ FE 1.1 forcespinning machine from FibeRio Technology Corp. of McAllen, Texas in order to produce precursor fibers. The precursor fibers were subjected UV radiation to cure the precursor fibers and produce pre-ceramic polymer fibers. The pre-ceramic polymer fibers were then placed on a graphitic foil substrate and subjected to pyrolysis in a furnace heated at a rate of 5° C./min up to 1300° C. in a nitrogen atmosphere and held at 1300° C. for 1.5 hours to produce a PDC h-BN fibers having an average fiber diameter of 1-3 μm. After heat treatment, the examples were characterized using SEM, EDS, FTIR and XRD.

In Examples 9-14, PVP, $BH_3NH_3$, and ethanol were mixed at the above wt. % and ratios. Ammonia borane is hygroscopic, and the ambient humidity may be controlled to affect properties of the fibers. Fibers formed from precursor solutions in examples 9-14 were strong and when collected included properties of a thin film with a 3D network (observed in the SEM).

Figure 1:
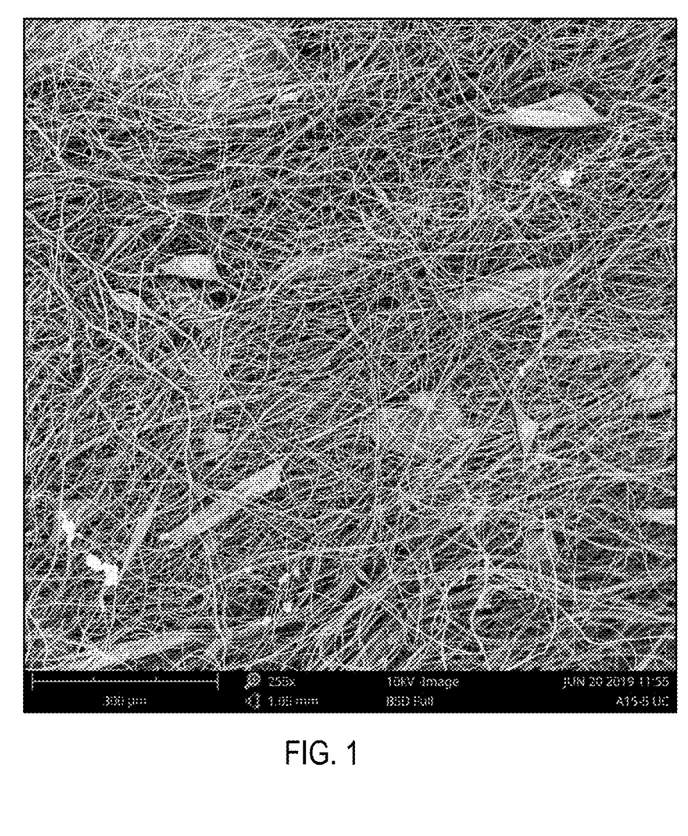
FIGS. 1-6 are SEM images of one example of fibers at different magnifications both before curing and after curing and pyrolysis according to the present subject matter.
Figure 2:
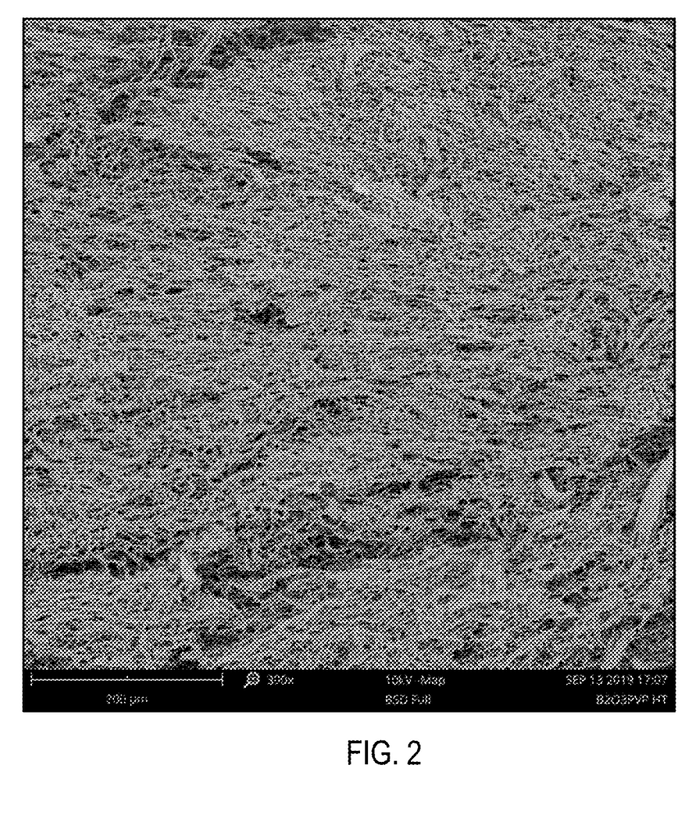
Figure 3:
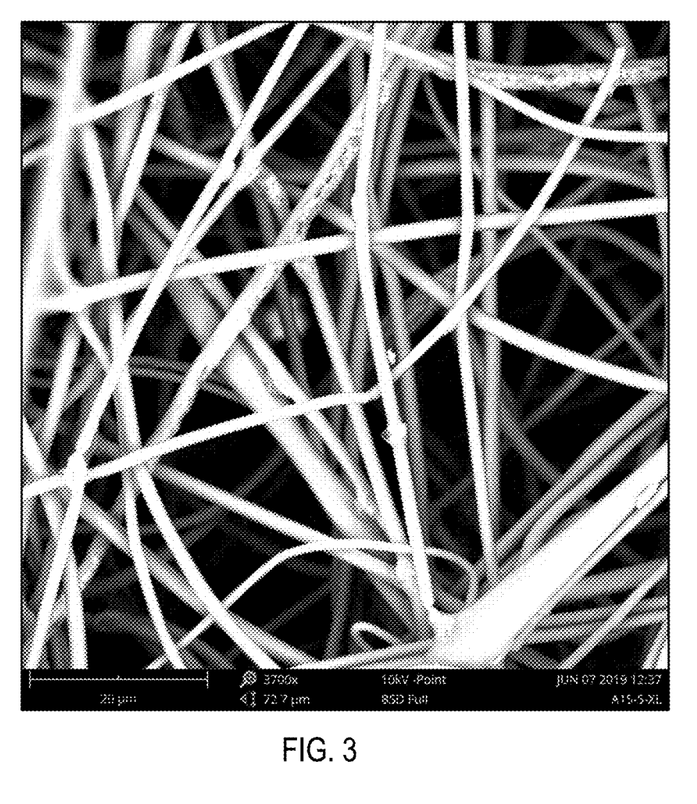
Figure 4:
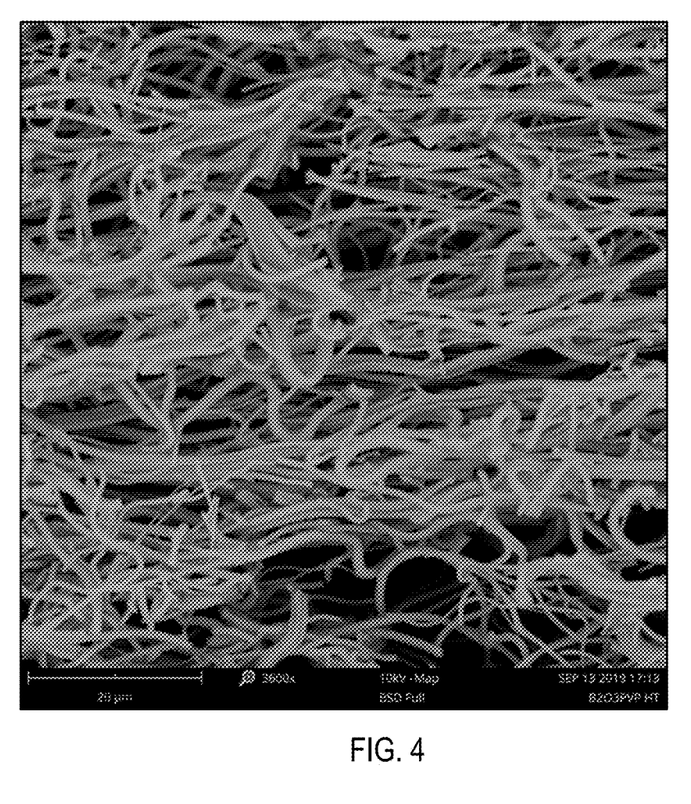
Figure 5:
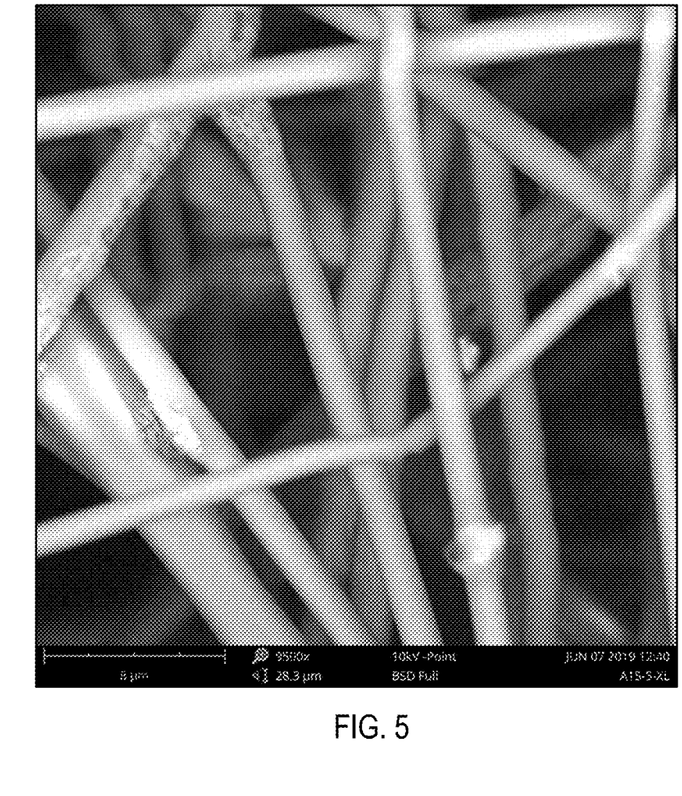
Figure 6:
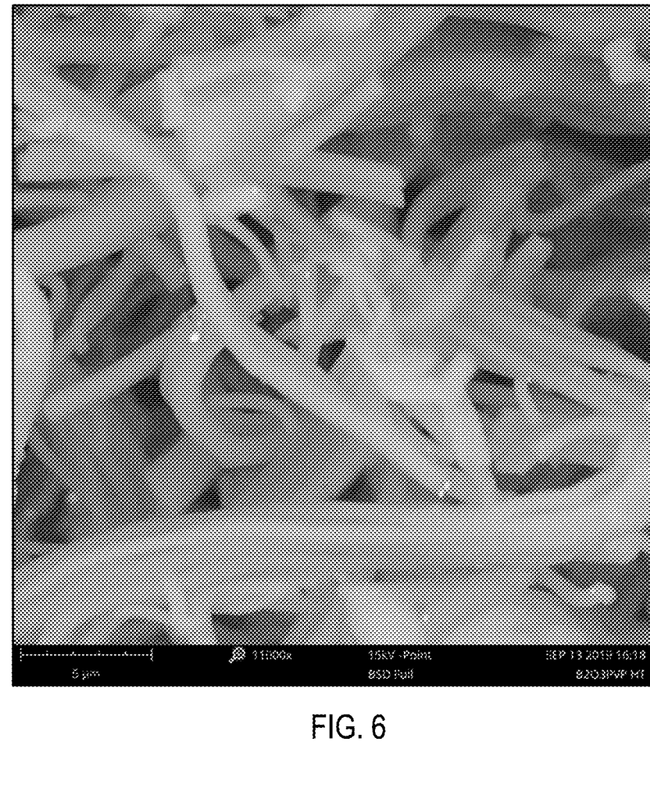

FIGS. 1-6 show SEM images of one example at different magnifications, where FIGS. 1, 3, 5 show precursor fibers before curing, and FIGS. 2, 4, 6 show ceramic h-BN fibers produced by curing and then pyrolyzing the precursor fibers. FIGS. 1 and 2 have similar magnification, FIGS. 3 and 4 have similar magnification, and FIGS. 5 and 6 have similar magnification. FIG. 1 is magnified at 255 times. FIG. 2 is magnified at 390 times. FIG. 3 is magnified at 3700 times. FIG. 4 is magnified at 3600 times. FIG. 5 is magnified at 9500 times. FIG. 6 is magnified at 11000 times.

As can be seen between FIGS. 1 and 2, the fibers maintained their fiber form factor through the curing and pyrolyzing step. As can be seen in between FIGS. 3 and 4, and between FIGS. 5 and 6, the fibers were broken down somewhat after curing and pyrolysis. This was likely due to the graphitic foil providing excess carbon during pyrolysis. However, the fiber form factor was nevertheless maintained.

An EDS spot analysis was performed for the pyrolyzed example, and the following results shown in Table 2 were attained.

TABLE 2

| Element | Atomic Concentration | Weight concentration |
|---|---|---|
| O | 43.97 | 49.44 |
| N | 32.87 | 32.36 |
| B | 16.04 | 12.19 |
| C | 7.12 | 6.01 |

Figure 7:
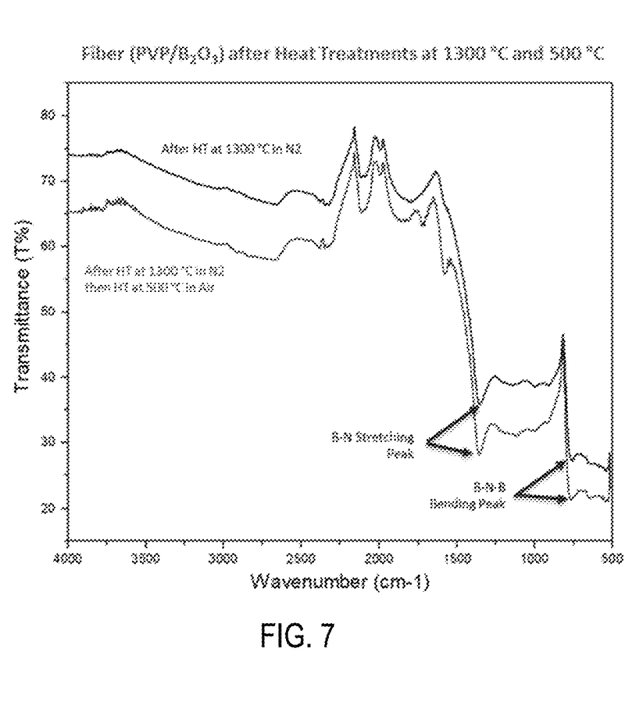
FIG. 7 is an FTIR analysis of an example of fibers, both after pyrolysis only and after pyrolysis and a subsequent heat treatment at 500° C. in air according to the present subject matter.

FIG. 7 shows an FTIR analysis of the example, both after pyrolysis only and after pyrolysis and a subsequent heat treatment at 500° C. in air. In FIG. 7, the top line in the graph indicated as "After HT at 1300° C. in N2" represent the example after only pyrolysis, where "HT" stands for heat treatment. The bottom line in the graph indicated as "After HT at 1300° C. in N2 then HT at 500° C. in Air" represents the example after pyrolysis and the subsequent 500° C. heat treatment. The FTIR of FIG. 7 shows the characteristic peaks of BN in the fibers after pyrolysis (i.e., "HT at 1300° C."). The example looked dart gray, and therefore a second heat treatment (i.e., "HT at 500° C.) was performed to see if it would remove any carbon impurity. The FTIR of FIG. 7 still shows the characteristic peaks of BN in the fibers even after the subsequent heat treatment at 500° C. As can be seen, both FTIR lines show characteristic B-N peaks, thus indicating the polymer was converted to h-BN.

Figure 8:
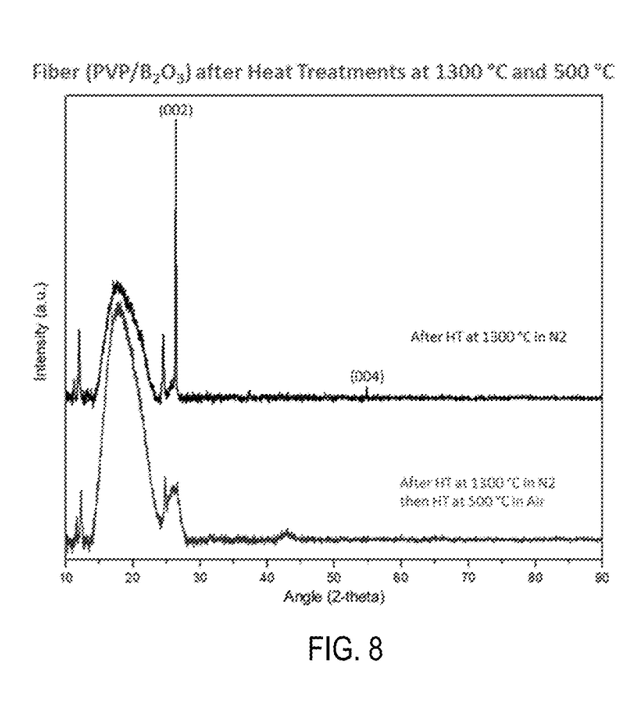
FIG. 8 is an XRD analysis of the example of FIG. 7, both after pyrolysis only and after pyrolysis and a subsequent heat treatment at 500° C. in air according to the present subject matter.

FIG. 8 shows XRD analysis of the example, both after pyrolysis only and after pyrolysis and a subsequent heat treatment at 500° C. in air. In FIG. 8, the top line in the graph indicated as "After HT at 1300° C. in N2" represent the example after only pyrolysis, where "HT" stands for heat treatment which is the subsequent heat treatment at 500° C. in air. The bottom line in the graph indicated as "After HT at 1300° C. in N2 then HT at 500° C. in Air" represents the example after pyrolysis and the subsequent 500° C. heat treatment. The XRD of FIG. 7 shows the characteristic peaks of BN (i.e., peak (002) at 262 and peak (004) at 55°) after pyrolysis, but not after pyrolysis and the subsequent 500° C. heat treatment in air.

It will be appreciated that various of the above-disclosed and other features and functions, or alternatives or varieties thereof, may be desirably combined into many other different systems or applications. Also, it will be appreciated that various presently unforeseen or unanticipated alternatives, modifications, variations, or improvements therein may be subsequently made by those skilled in the art which are also intended to be encompassed by the following claims.

The invention claimed is:

1. A method of preparing hexagonal boron nitride (h-BN) fibers comprising:
mixing polyvinylpyrrolidone (PVP) and boron oxide ($B_2O_3$) to form a polymer precursor or mixing PVP and ammonia borane ($BH_3NH_3$) to form the polymer precursor;
forcespinning the polymer precursor to form fibers of the polymer precursor;
curing the fibers to form polymer fibers; and
pyrolyzing the polymer fibers to form the h-BN fibers.

2. The method according to claim 1, wherein the polymer precursor is a solution including a solute dissolved in a solvent, and wherein the solute comprises PVP and $B_2O_3$, or PVP and $BH_3NH_3$.

3. The method according to claim 2, wherein the solute comprises 70-80 wt. % PVP and 20-30 wt. % $B_2O_3$.

4. The method according to claim 2, wherein the solvent includes water or ethanol, and the solvent evaporates during forcespinning.

5. The method according to claim 4, wherein the solvent includes ethanol.

6. The method according to claim 5, wherein a weight ratio of PVP to ethanol is 0.15-0.20.

7. The method according to claim 5, wherein the polymer precursor includes PVP and $B_2O_3$, and a weight ratio of ethanol to $B_2O_3$ is 15-25.

8. The method according to claim 7, wherein the weight ratio of ethanol to $B_2O_3$ is 16-21.

9. The method according to claim 1, wherein the polymer precursor is a solution including 10-20 wt. % PVP and 3-6 wt. % $B_2O_3$ dissolved in 75-85 wt. % ethanol.

10. The method according to claim 1, wherein the PVP has a molecular weight of 300,000 or higher.

11. The method according to claim 1, wherein the fibers are cured by ultraviolet (UV) radiation.

12. The method according to claim 1, wherein the pyrolyzing includes heating the polymer fibers at 1000-1500° C. for up to 3 hours in an atmosphere including nitrogen, nitrogen and hydrogen, or ammonia.

13. The method according to claim 6, wherein the polymer fibers are pyrolyzed in a nitrogen atmosphere.

14. The method according to claim 6, wherein the pyrolyzing includes heating the polymer fibers from ambient temperature up to a peak temperature of 1000-1500° C. at a rate of 5° C./min and a dwell time at the peak temperature up to 3 hours.

15. The method according to claim 6, wherein the pyrolyzing includes heating the polymer fibers at 1250-1350° C. for 1-2 hours.

16. The method according to claim 1, wherein the polymer precursor does not include a polymerization catalyst.

17. The method according to claim 16, wherein the polymer precursor consists of PVP, $B_2O_3$, and ethanol.

18. The method according to claim 1, wherein the h-BN fibers have average diameters of 200 nm-6 μm.

19. The method according to claim 18, wherein the h-BN fibers have average diameters of 1-3 μm.

20. The method according to claim 1, further including after the pyrolysis cooling the h-BN fibers to ambient temperature and then heating the h-BN fibers at 300-500° C. in air.

* * * * *